April 29, 1969 G. H. MAY ET AL 3,441,188

ROLL FEED DEVICE

Filed July 13, 1967

INVENTORS
GORDON H. MAY
JOSEPH E. SHEPARD

BY *Robert B. Crouch*

ATTORNEY

United States Patent Office 3,441,188

Patented Apr. 29, 1969

3,441,188

ROLL FEED DEVICE

Gordon H. May, San Jose, and Joseph E. Shepard, Los Gatos, Calif., assignors to International Business Machines Corporation, Armonk, N.Y., a corporation of New York Filed July 13, 1967, Ser. No. 653,135
Int. Cl. B65h 17/22, 17/20
U.S. Cl. 226—180 10 Claims

ABSTRACT OF THE DISCLOSURE

The present invention relates to a bi-directional feed roll drive for a recording medium and more particularly to a combined feed and registration drive which includes an automatic medium release when drive motion is interrupted. This device employs a single roll for bi-directional drive of the medium and for alignment of the medium against a registration surface, the roll being so mounted as to be automatically withdrawn from contact with the medium whenever drive motion is interrupted.

*Background information*

Feed roll drives of various types have been proposed for transporting a recording medium such as magnetic tape, credit card, admission or commutation tickets, etc. These devices generally include one or more friction drive rolls and a backing member such as an idler roller or plate, the recording medium being positioned between the friction roll and the backing member. The friction rolls are usually loaded toward the backing member and into engagement with the recording medium. Through friction between the drive roll and the recording medium, rotational movement of the roll is transformed into linear movement of the medium. To permit reading or writing of information on the medium, it is aligned relative to the backing member by confining both lateral edges or by forcing one edge of the medium into contact with a registration surface on the backing member. In the latter case, a skid roll may be provided, the axis of which is slightly skewed relative to the direction of movement of the medium, so as to transmit a lateral force to the medium which urges it into contact with the registration surface. In the case of conventional magnetic tape drives a pair of drive capstans are provided, one for each direction of movement of the tape, and alignment is achieved by confining the tape against a backing member by means of a spring-loaded pressure pad. In the case of unit record equipment and similar document feeding apparatus, a skid roll is used to align the card or document against a registration surface. Card and document feed devices have also employed a registration roll having radially extending, deformable ribs, the roll being positioned adjacent a backing plate such that the ribs are deformed toward the registration surface. A document passing between the backing plate and the registration roll will obtain a component of force from the deformed ribs toward the registration surface. The various feed roll devices heretofore known have been expensive to manufacture due to the separate forward and reverse drive capstans, separate skid or registration rolls, and the positive loading means used to position the drive roll against the medium or vice versa. In addition, the prior known devices have been time consuming to operate, particularly when replacing the recording medium, due to the positive loading between the drive roll and the medium and between the alignment or registration devices and the backing member.

*Present invention*

The present invention avoids the shortcomings of the prior art devices by provision of a bi-directional feed roll drive which is economical to manufacture and simple to operate. These results are obtained in the present invention by provision of a single roll for bi-directional drive and alignment of the medium and the use of dynamic forces for the roll-to-medium loading required for both drive and registration. In this invention a feed roll is supported on a driven shaft adjacent a backing member such that in the static condition of the device the roll is withdrawn from the backing member and is out of contact with the recording medium. In the dynamic condition the roll is moved toward the backing member and loaded against the recording medium by the dynamic forces of rotation. In addition, the roll is allowed to cock slightly relative to the shaft to impart a lateral component to the drive force transmitted to the recording medium in order to align the medium with a registration surface.

The foregoing and other objects, features and advantages of the invention will be apparent from the following more particular description of the preferred embodiment of the invention as illustrated in the accompanying drawings.

Figure 4:
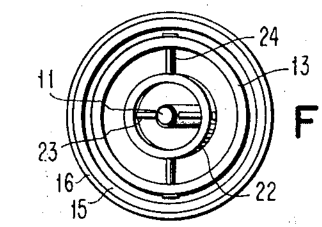
FIG. 4 is a top plan view of the feed roll drive of FIG. 1.
Figure 6:
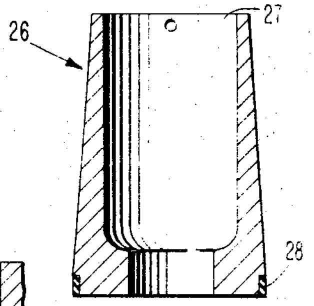
FIGS. 6 and 7 are elevation views of alternative roll embodiments.
Figure 1:
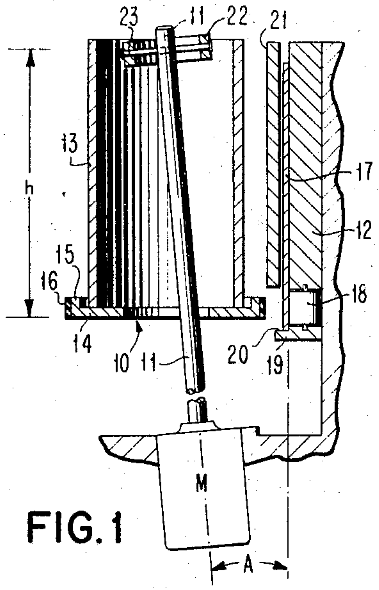
FIG. 1 is an elevation view partly in section of a preferred embodiment of the feed roll drive of the present invention in its static condition.
Figure 2:
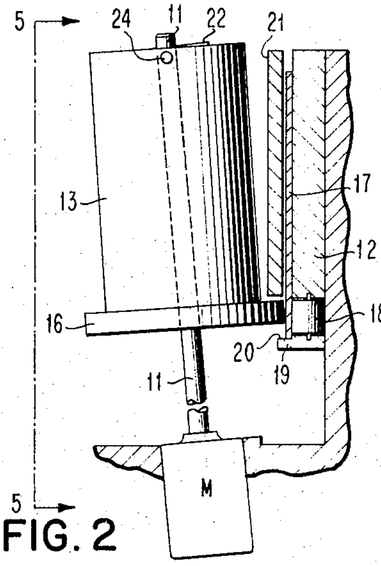
FIG. 2 is an elevation view similar to FIG. 1 showing the feed roll drive in its dynamic condition.
Figure 7:
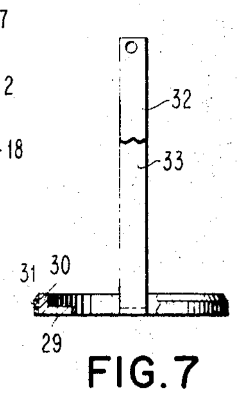
Figure 3:
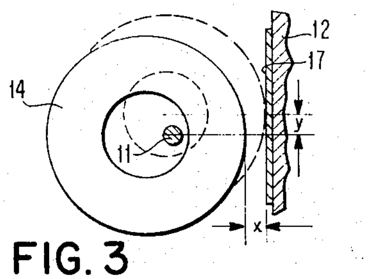
FIG. 3 is a bottom view of the feed roll drive of FIG. 1.
Figure 5:
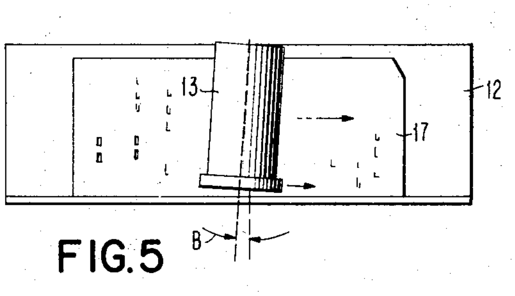
FIG. 5 is an elevation view taken along line 5—5 of FIG. 2.
Figure 8:
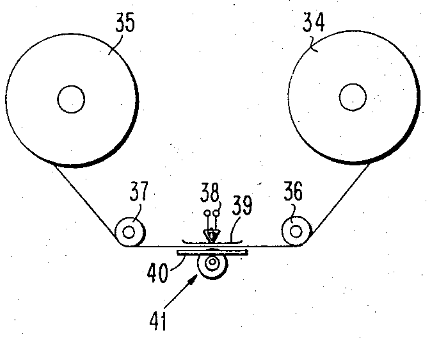
FIG. 8 is a diagrammatic view showing the present feed roll drive as applied to a magnetic tape recorder.
Figure 9:
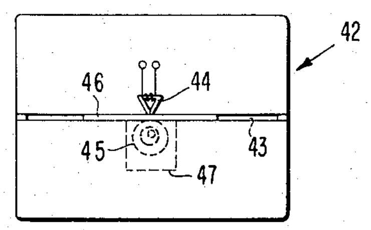
FIG. 9 is a diagrammatic view showing the present feed roll drive as applied to a card or ticket terminal.

A feed roll drive assembly according to the present invention is illustrated in FIG. 1 as including a feed roll assembly 10, a driven shaft 11, and a backing member 12. The feed roll assembly comprises a generally cylindrical support section 13 which is suspended from the shaft, and a feed roll which includes an annular radial flange 14 secured to the free edge of the support section, an annular lip 15 carried by the flange and a layer of suitable material 16 having a high coefficient of friction adhered to the periphery of the lip. The shaft 11 is mounted adjacent the backing member 12 and is driven by a suitable motor. The shaft is spaced from the backing member in a vertical plane extending normal to the backing member with the longitudinal axis of the shaft displaced from the vertical to form a small upwardly divergent angle A with the exposed surface of the backing member. The backing member is an elongated plate having a smooth outer surface along which a recording medium 17 is adapted to be transported. An idler roller 18 may be mounted in the backing member opposite the feed roll 10 with a portion of its circumference flush with the exposed surface of the backing member. A flange 19 at the lower edge of the backing member forms a registration edge 20 for aligning the recording medium. A guide member 21 is spaced from the backing member to define an entry slot to receive the recording medium. The guide member, which may be a relatively short plate, terminates short of the registration surface to provide an opening of lifting it off the backing plate while the feed roll drive is in its static condition. In FIG. 9 the feed roll drive is illustrated as applied to a terminal for reading and updating information on a ticket or credit card. A terminal shown schematically at 42 includes a transverse slot 43, the opposite ends of which are closed off to form stops. A magnetic transducer 44 is positioned on one side of the slot while a feed roll drive 45 is positioned on the other. A card or ticket 46 is inserted into the slot and then power applied to the feed roll drive from a conventional electric clock motor shown schematically at 47. The feed roll device will drive the cards in either direction against the stop at that end of the slot and then the motor will automatically reverse itself and drive the card to the opposite end of the slot and then reverse again. As long as the drive is energized, the card is gripped between the friction surface on the roll and the opposite side of the slot to prevent withdrawal of the card. The card is automatically aligned within the slot by the skew of the drive surface as discussed above. When the transaction is completed the motor is turned off and the drive automatically releases the card for removal from the slot.

The physical dimensions of a given feed roll device according to the present invention will vary according to the particular application. However, for optimum performance a relative relationship among the dimensions should be maintained according to the following formula:

$$\text{ID}=2(\tan B)h(1.414)+\text{OD}$$

$$x=\left(\frac{\text{ID}-\text{OD}}{2}\right)-.707\left(\frac{\text{ID}-\text{OD}}{2}\right)$$

$$\tan A=\text{ID}/2h$$

ID=inside diameter of bottom of roll
OD=outside diameter of drive shaft
$h$=height of pivot connection above bottom of roll
A=angle of skew
B=angle between shaft and backing member
X=amount of roll release While the invention has been particularly shown and described with reference to preferred embodiments thereof, it will be understood by those skilled in the art that the foregoing and other changes in the form and details may be made therein without departing from the spirit and scope of the invention.

What we claim is:

1. A feed roll drive for bi-directional feed and alignment of a recording medium relative to a read-write station, comprising:

a motor driven shaft positioned adjacent the read-write station, a combined feed and registration roll, and a drive connection between the shaft and the roll which moves the roll into contact with the recording medium when the shaft is rotated and withdraws the roll from contact when the drive force is interrupted.

2. A feed roll drive as set forth in claim 1 wherein: the feed roll is suspended from the shaft for movement radial thereof.

3. A feed roll drive as set forth in claim 1 wherein: the read-write station includes a backing member and a registration surface which define a path of movement for the recording medium, and the shaft is positioned adjacent the backing member and at an acute angle thereto.

4. A feed roll drive as defined in claim 3 wherein: the feed roll is pivotally suspended from the shaft.

5. A feed roll drive as defined in claim 3 wherein: the feed roll is suspended from the shaft through a pivotal connection spaced from the feed roll.

6. A feed roll drive as defined in claim 5 wherein: the pivotal connection permits movement of the feed roll in two dimensions radially of the drive shaft.

7. A feed roll drive for bi-directional feed and alignment of a recording medium along a backing plate which includes a registration surface, including:

a motor-driven shaft mounted adjacent to and in spaced relation with the backing member, a feed roll assembly including a cylindrical feed roll, the assembly being telescoped on the shaft, a drive connection between the assembly and the shaft which under the influence of static forces, positions the feed roll a short distance from the medium and which under the influence of dynamic forces loads the roll into driving engagement with the medium.

8. A feed roll drive as defined in claim 7 wherein: the feed roll assembly is pivotally connected to the shaft at a point spaced from the feed roll.

9. A feed roll drive as defined in claim 8 wherein: the pivotal connection between the assembly and the shaft permits movement of the feed roll in two dimensions radially of the drive shaft.

10. A feed roll drive as defined in claim 7 wherein: the connection permits the feed roll to skew relative to the shaft to impart to the recording medium a drive force having components both parallel to and toward the registration surface.

References Cited

UNITED STATES PATENTS

| | | | |
|---|---|---|---|
| 2,995,364 | 8/1961 | Frederick | 271—52 |
| 2,998,906 | 9/1961 | Vice | 226—191 X |

M. HENSON WOOD, Jr., *Primary Examiner.*

RICHARD A. SCHACHER, *Assistant Examiner.*

U.S. Cl. X.R.

226—194